United States Patent
Limaye

(10) Patent No.: US 6,642,966 B1
(45) Date of Patent: Nov. 4, 2003

(54) SUBLIMINALLY EMBEDDED KEYS IN VIDEO FOR SYNCHRONIZATION

(75) Inventor: Ajit M. Limaye, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 429 days.

(21) Appl. No.: 09/707,520

(22) Filed: Nov. 6, 2000

(51) Int. Cl.[7] ............................................. H04N 7/08
(52) U.S. Cl. ..................... 348/473; 348/460; 348/461; 348/464; 348/512; 725/136; 725/112; 725/113; 725/36
(58) Field of Search ................. 348/473, 474, 348/461, 460, 462, 465, 464, 468, 512, 518; 725/112, 113, 136, 109, 110, 51, 32, 36; 709/217, 218, 219

(56) References Cited

U.S. PATENT DOCUMENTS

| | | | |
|---|---|---|---|
| 4,969,041 A | | 11/1990 | O'Grady et al. |
| 5,543,849 A | * | 8/1996 | Long ........................... 348/460 |
| 5,585,858 A | * | 12/1996 | Harper et al. ................ 348/485 |
| 5,774,664 A | * | 6/1998 | Hidary et al. ................ 725/110 |
| 5,774,666 A | * | 6/1998 | Portuesi ....................... 725/110 |
| 5,778,181 A | * | 7/1998 | Hidary et al. ................ 725/110 |
| 5,987,509 A | * | 11/1999 | Portuesi ....................... 725/113 |
| 6,018,768 A | * | 1/2000 | Ullman et al. .............. 709/218 |
| 6,058,430 A | * | 5/2000 | Kaplan ........................ 709/245 |
| 6,061,719 A | * | 5/2000 | Bendinelli et al. .......... 709/218 |
| 6,075,561 A | | 6/2000 | Janko |
| 6,169,541 B1 | * | 1/2001 | Smith ........................... 345/716 |
| 6,173,317 B1 | * | 1/2001 | Chaddha et al. ............ 709/219 |
| 6,211,919 B1 | * | 4/2001 | Zink et al. ................... 348/473 |
| 6,357,042 B2 | * | 3/2002 | Srinivasan et al. ........... 725/32 |
| 6,426,778 B1 | * | 7/2002 | Valdez, Jr. .................. 348/461 |
| 6,493,872 B1 | * | 12/2002 | Rangan et al. ................ 725/32 |
| 2001/0037500 A1 | * | 11/2001 | Reynolds et al. ............. 725/36 |
| 2003/0018966 A1 | * | 1/2003 | Cook et al. ..................... 725/2 |

OTHER PUBLICATIONS

"Reducing Bit–Rate Requirements for Digital Video" by Eric Hakanson, Tektronix, Inc. Research Disclosure No. 435051, Jul. 2000.

* cited by examiner

*Primary Examiner*—John Miller
*Assistant Examiner*—Jean W. Désir
(74) *Attorney, Agent, or Firm*—Francis I. Gray

(57) ABSTRACT

A data file containing metadata and/or control data is synchronized with associated audio/video data by subliminally embedding a key in a frame of the audio/video. The key indicates the location of the data file and a time after the embedded frame in which the data file is to be activated to be in synchronism with the audio/video. The data file is accessed via an alternate channel and held in a buffer until the time indicated by the key. The metadata from the data file is played out for display in synchronism with the associated audio/video data, and instructions contained in the control data are executed in synchronism with the associated audio/video data.

9 Claims, 1 Drawing Sheet

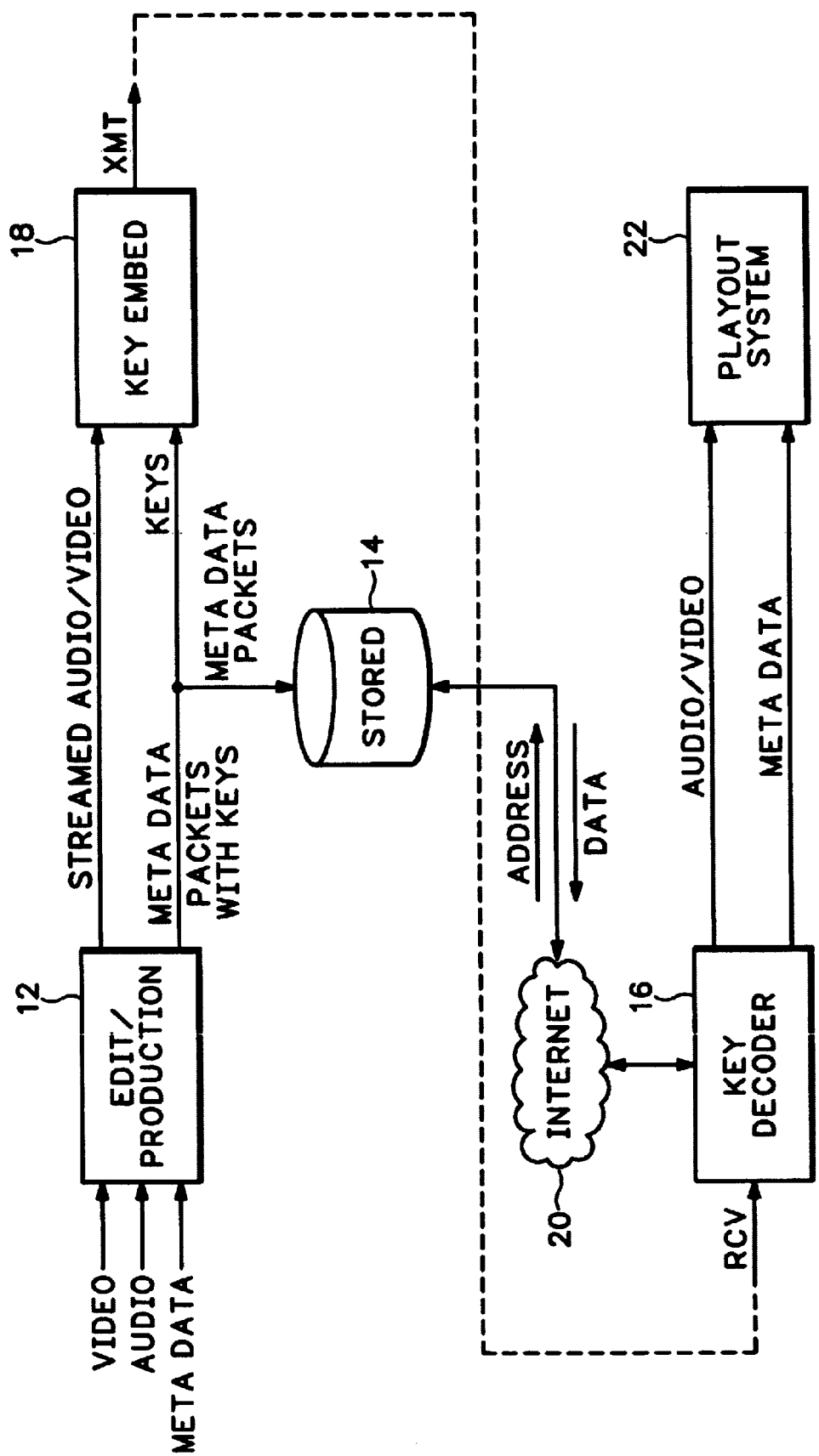

SUBLIMINALLY EMBEDDED KEYS IN VIDEO FOR SYNCHRONIZATION

BACKGROUND OF THE INVENTION

The present invention relates to multimedia systems, and more particularly to a subliminally embedded key in a video signal for synchronization of playout control of multimedia data and/or of execution of instructions contained in control data.

Watermarking of video signals is becoming of increasing use as a means of transmitting very low rate data as part of the video signal. Watermarking of video has been proposed for performing audio to video delay compensation, for indicating authentication or program ownership and for verifying playing of a video signal such as in advertisement logging. The watermarking technique inserts the very low rate data into the active portion of the video signal so as to be invisible while still having the robustness to survive video signal processing including multiple generations of compression encoding/decoding. See U.S. Pat. No. 4,969,041 issued to William O'Grady et al on Nov. 6, 1990 entitled "Embedment of Data in a Video Signal" and co-pending U.S. patent application Ser. No. 08/829,524 by Daniel Baker et al filed on Mar. 28, 1997 entitled "Transparent Embedment of Data in a Video Signal".

Also the use of auxiliary channels for transmitting data related to video signals is known, as shown in U.S. Pat. No. 6,075,561 issued to Bozidar Janko on Jun. 13, 2000 entitled "Low Duty-Cycle Transport of Video Reference Images". With the advent of the Internet, proposals have been made to use the Internet as the auxiliary channel for transporting data. It is anticipated that when video that is streamed over the Internet is played out, it may be desirable to also play out other data—called metadata—that is associated with the video to immerse the viewer in the experience. It may also be desirable to transmit control data to the equipment receiving the video. This control data may be used for one or more of the following purposes: (1) cue a commercial; (2) specify a destination to which the video is to be routed; (3) control auxiliary equipment to actuate other sensory cues such as activation of special lighting or sound effects; (4) control the parameters for compressing the video prior to storage; etc.

However transmitting the metadata is not currently possible using watermarking technology with video. The bit rate of the metadata, such as 9600 baud, is too high for the very low data rate channel afforded by watermarking. Transmission of control data may or may not be possible using watermarking technology directly, depending upon the quantity of data which varies with the application.

The problem that arises is how to synchronize the metadata or other control data with the video when they are transmitted over different channels so that the metadata appears at the proper point with relationship to the video when seen by the viewer, or the control data is retrieved and used at the proper point with relationship to the video.

What is desired is a means for synchronizing the metadata or control data with the associated video when the video is played out.

BRIEF SUMMARY OF THE INVENTION

Accordingly the present invention provides subliminally embedded keys in video that act as pointers and synchronizing signals for a data file containing metadata and/or control data so that the metadata is displayed with the video and/or instructions contained in the control data are executed at the proper time. At the transmission end of a system a key is generated in synchronization with the video, the key being associated with corresponding data file. The key is embedded subliminally in the video at an appropriate point using watermarking techniques. At a receiver the key is decoded from the video and used to access a network server that contains the data file. Once retrieved the metadata from the data file is displayed with the video at a point in synchronization with the video as indicated by the key, or the control data is used to perform one or more auxiliary functions at designated times. For small data files where the retrieval delay is small, the key may be just a few frames before the first video frame which is associated with the data file, while for large data files the key may be inserted several seconds before the first video frame which is associated with the data file. The key provides both an "address" for retrieving the data file and a time from the key frame when the metadata from the data file is to be played out with the video for a viewer or when the instructions contained in the control data are to be executed. In this way the data file is synchronized with the video.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a system for synchronizing a data file with video using subliminally embedded keys according to the present invention.

DETAILED DESCRIPTION OF THE INVENTION

Referring now to the FIGURE video, audio and an associated data file containing metadata and/or control data is input to an edit/production system 12. The output from the edit/production system 12 is streamed audio/video and the data file with associated keys. The data file is stored in an appropriate storage device 14, such as a network server, and the keys are input with the streaming audio/video to a key embedment system 16 such as those described in U.S. Pat. No. 4,969,041 and U.S. patent application Ser. No. 08/829,524 referenced above. The keys have information that indicates the location of the associated data file in the storage medium 14 and a time in number of frames from the frame in which the key is embedded when the control instructions from the data file should be executed or the metadata should be played out to be in synchronism with the audio/video stream to account for latency in accessing the data file. Large data files require a longer access time, so the key is embedded in a frame much further ahead of the frame where the data file is to be used, whereas small data files may not require as much "leads time".

The streaming audio/video with embedded keys is transmitted over a transmit channel to a receive site where a key decoder 18 extracts the keys from the streaming audio/video and accesses an alternate channel 20, such as the Internet. The information from the keys is transmitted over the alternate channel 20 to the storage medium 14 and the data file is transferred from the storage medium to a buffer in the key decoder 18. When the number of frames from the frame in which the key is embedded has passed, as indicated by the key, the metadata from the data file is played out with the streaming audio/video to a playout system 22 so as to be synchronized with the audio/video stream. Alternatively the instructions contained in the control data of the data file are executed. The playout system 22 may be a set top box for a consumer television set or multimedia computer where the viewer can control whether or not to view the metadata or only portions of the metadata. The playout system 22 may also be the device responsible for implementing the instructions contained in the control data.

Thus the present invention provides subliminally embedded keys in video for synchronization of a data file containing metadata and/or control data with associated audio/video streams, the data file being provided by an alternate channel and the keys having an address for the data file as well as a time when the metadata in the data file plays out with the audio/video streams or when the instructions in the control data are executed.

What is claimed is:

1. A method of synchronizing a data file with associated audio/video data using subliminally embedded keys comprising the steps of:

at a transmit site embedding a key subliminally in the audio/video data, the key indicating a location of the data file on a network storage medium and a latency time;

at a receive site extracting the key from the audio/video data;

accessing the network storage medium according to the location indicated by the key;

using the data file in synchronism with the audio/video data according to the latency time.

2. The method as recited in claim 1 wherein the data file comprises metadata to be played out in synchronism with the associated audio/video data and the using step comprises the step of playing out the metadata for display in synchronism with the audio/video data.

3. The method as recited in claim 1 wherein the data file comprises control data to be activated in synchronism with the associated audio/video data and the using step comprises the step of activating instructions contained in the control data for execution in synchronism with the audio/video data.

4. A system for synchronizing a data file with audio/video data at a receiving site, the data file being associated with the audio/video data, comprising:

a storage medium for storing the data file;

means for subliminally embedding a key associated with the data file within an active video portion of the audio/video data prior to transmission to the receiving site over a transmission channel;

means at the receiving site for extracting the key from the active video portion;

means for accessing the storage medium to retrieve the data file in response to the key via an alternate channel unrelated to the transmission channel, the data file being stored in a data buffer at the receiving site; and means for playing out the data file from the data buffer in synchronization with the audio/video data at a time indicated by the key.

5. The system as recited in claim 4 wherein the key comprises an address for the data file within the storage medium and a latency time.

6. The system as recited in claim 5 wherein the latency time comprises a delay variable indicating a number of frames of the audio/video data after a frame in which the key is subliminally embedded at which the data file is to be played out from the data buffer in order to be synchronized with the audio/video data.

7. The system as recited in claim 6 wherein the delay variable is a function of an access time to retrieve the data file from the storage medium and a size of the data file.

8. The system as recited in any of claims 4–7 wherein the data file comprises metadata associated with the audio/video data for playing out in synchronization with the audio/video data.

9. The system as recited in any of claims 4–7 wherein the data file comprises control data associated with the audio/video data for execution in synchronization with the audio/video data.

* * * * *